(12) United States Patent
Takahashi

(10) Patent No.: US 6,554,473 B2
(45) Date of Patent: Apr. 29, 2003

(54) DYNAMIC PRESSURE BEARING DEVICE

(75) Inventor: Takeshi Takahashi, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/813,717

(22) Filed: Mar. 21, 2001

(65) Prior Publication Data

US 2001/0026652 A1 Oct. 4, 2001

(30) Foreign Application Priority Data

Apr. 4, 2000 (JP) ........................................ 2000-101711

(51) Int. Cl.$^7$ ............................................... F16C 32/06
(52) U.S. Cl. ........................................ 384/107; 384/119
(58) Field of Search ................................ 384/107, 100, 384/114, 115, 117, 119, 120, 220

(56) References Cited

U.S. PATENT DOCUMENTS

| 5,356,226 A | * | 10/1994 | Onishi et al. ................ 384/119 |
| 5,988,886 A | * | 11/1999 | Takahashi ................... 384/107 |
| 6,361,216 B1 | * | 3/2002 | Takahashi et al. .......... 384/107 |

FOREIGN PATENT DOCUMENTS

JP          11-344027         12/1999

* cited by examiner

*Primary Examiner*—Pam Rodriguez
(74) *Attorney, Agent, or Firm*—Jordan and Hamburg LLP

(57) ABSTRACT

A dynamic pressure bearing device having a structure in which forces in the radial and thrust directions can be easily balanced with each other, and lubricant hardly leaks is provided. The device has: a housing having an opening in each of both end portions, and an internal space; a shaft passing through the openings; and a flange disposed on the shaft, and in which radial dynamic pressure generating grooves and thrust dynamic pressure generating grooves are formed, radial dynamic pressure bearings are respectively formed in vicinities of the end openings of the housing, and thrust dynamic pressure bearings for supporting both faces are formed between the radial dynamic pressure bearings. The radial dynamic pressure bearings between which the thrust dynamic pressure bearings are interposed are formed symmetrically with respect to the thrust dynamic pressure bearings.

6 Claims, 5 Drawing Sheets

DYNAMIC PRESSURE BEARING DEVICE

BACKGROUND OF THE INVENTION

The invention relates to a dynamic pressure bearing device, and more particularly to a dynamic pressure bearing device having a structure in which an opening is formed in each of both the end portions of a housing, a shaft is passed through the housing so as to form radial dynamic pressure bearings and thrust dynamic pressure bearings in the housing such that forces can be easily balanced with each other, and lubricant hardly leaks.

In a hard disk drive which is to be mounted in a personal computer or the like, in order to cope with high speed and high accuracy, a dynamic pressure bearing device using lubricant (working fluid) is used.

For example, a dynamic pressure bearing device is used in which, as shown in FIG. 5, a rotation shaft 31 is placed in a housing 30, V-like or herringbone-like radial dynamic pressure generating grooves 33 and 34 are formed in an inner peripheral face of the housing 30, a flange 32 is disposed on the rotation shaft 31, and thrust dynamic pressure generating grooves 35 and 36 are formed in a surface of the flange. In this case, a step 30c is formed in an upper portion of the housing 30, and a spacer 37 is placed, whereby chambers 38 and 39 are formed to prevent working fluid from leaking. In this way, dynamic pressure generating grooves are formed in the radial and thrust directions, so that a balance can be attained even for high speed rotation. In some cases, radial dynamic pressure generating grooves may be formed in the outer peripheral face of the rotation shaft 31.

Alternatively, as shown in FIG. 6, a rotation shaft 41 is placed in a housing 40, radial dynamic pressure generating grooves 43 and 44 are formed on the housing 40 or the rotation shaft 41, spacers 45 and 46 are respectively disposed in upper and lower portions of the rotation shaft 41, and a flange 42 on which thrust dynamic pressure generating grooves 47 and 48 are formed is disposed on the rotation shaft 41. Furthermore, when flow of the lubricant serving as a working fluid occurs, circulator holes 50 and 51 are disposed and chambers 52 and 53 are formed, so that the working fluid is prevented from leaking to the outside.

In the dynamic pressure bearing device of the structure shown in FIGS. 5 or 6 having an opening in each of the end portions, one opening 30a or 40a is adjacent to the thrust dynamic pressure bearing portion, and the other opening 30b or 40b is adjacent to the radial dynamic pressure bearing portion. In this structure, when forces in the radial and thrust dynamic pressure bearing portions fail to balance with each other, a flow of the lubricant occurs. Therefore, the structure in which the circulator holes 50 and 51 and the chambers 38 and 39 are formed (FIG. 5) or the chambers 52 and 53 are formed (FIG. 6) as described above is employed. When the circulator hole 50, the chamber 38 or 52, or the like is disposed, there arises a problem in that the working cost and the assembly cost are increased. Moreover, the number of parts is increased and the structure is complicated. Furthermore, there is another problem in that a balance is easily lost by a moment load.

SUMMARY OF THE INVENTION

The present invention addresses the problems discussed above. It is an object of the invention to provide a dynamic pressure bearing device having a structure in which forces in the radial and thrust directions can be easily balanced with each other, and lubricant hardly leaks.

In order to solve the problems, the dynamic pressure bearing device of the present invention provides a dynamic pressure bearing device which comprises: a housing having an opening in each end portion; a shaft passing through the openings; and a flange disposed on the shaft, and in which radial dynamic pressure generating grooves and thrust dynamic pressure generating grooves are formed between the housing and the shaft, and between an internal space of the housing and the flange to form a radial dynamic pressure bearing portion and a thrust dynamic pressure bearing portion, respectively, wherein radial dynamic pressure bearings are respectively formed in vicinities of the end openings of the housing, and thrust dynamic pressure bearings for supporting both faces are formed between the radial dynamic pressure bearings.

The present invention is further provides radial dynamic pressure bearings between which thrust dynamic pressure bearings are formed on both faces of a flange and an internal space of a housing are interposed wherein the radial dynamic pressure bearings are formed symmetrically with respect to the thrust dynamic pressure bearings.

The present invention of also provides a housing for forming the radial dynamic pressure bearings with interposing the thrust dynamic pressure bearings wherein the housing is split into housing portions, a fitting guiding portion is disposed in a vicinity of the thrust dynamic pressure bearings, and,the housing portions are fitted to each other.

DETAILED DESCRIPTION OF THE PREFERRED EMBODIMENTS

Hereinafter, specific embodiments of the invention will be described with reference to the accompanying drawings.

Figure 1:
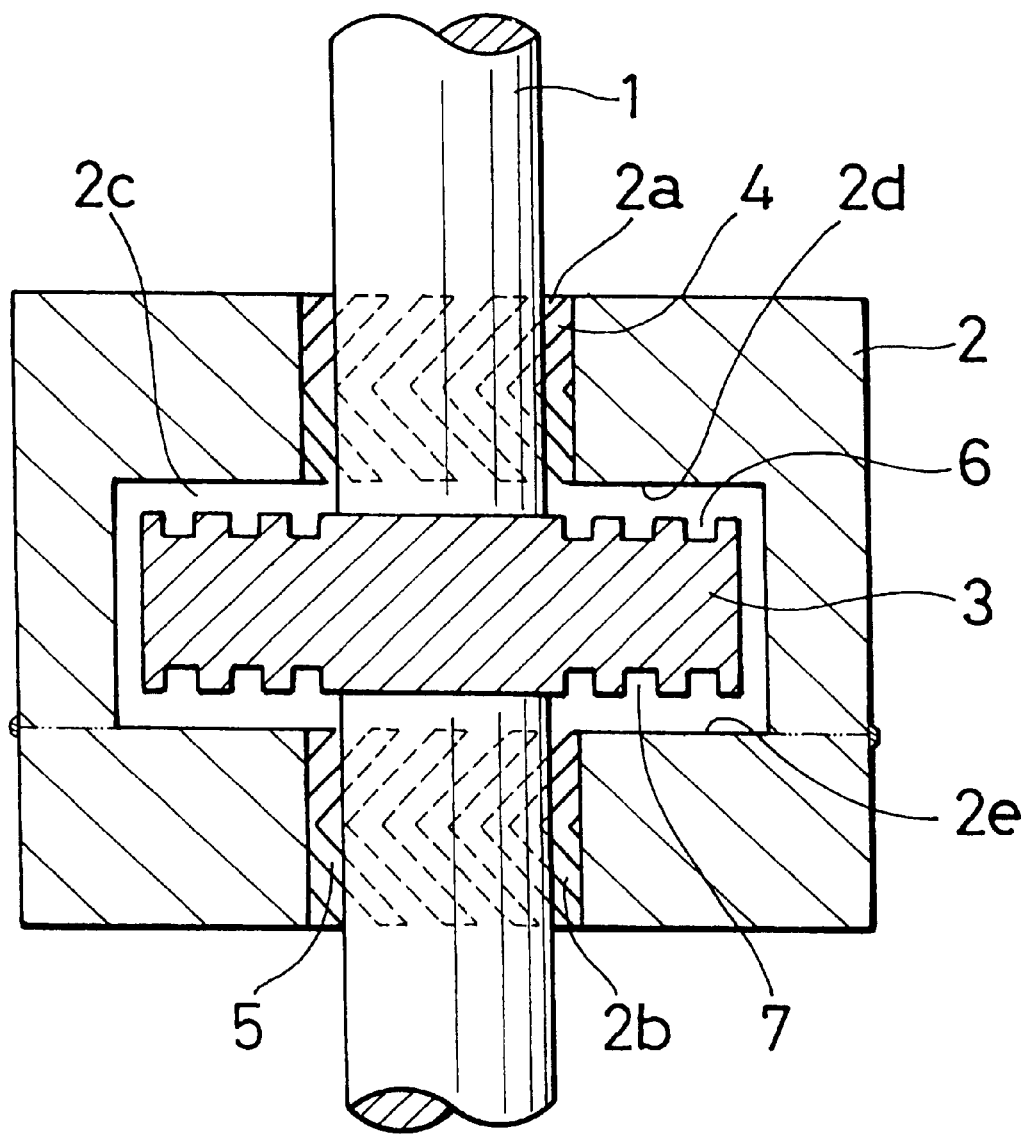
FIG. 1 is a section view showing the configuration of the dynamic pressure bearing device of the invention.

FIG. 1 is a section view showing a configuration of a dynamic pressure bearing device of the present invention. The dynamic pressure bearing device comprises a housing 2, a shaft 1, and a flange 3 disposed on the shaft 1. In the embodiment, a space 2c into which the flange 3 is to be placed is formed in the housing 2. The space 2c is disposed just in the vertically symmetrical or middle position of the housing 2. The shaft 1 is fitted into the housing 2 in which end openings 2a and 2b are formed. V-like or herringbone-like radial dynamic pressure generating grooves 4 and 5 are formed in the surface of one of the housing 2 and the shaft 1 (in FIG. 1, the grooves are formed on the housing 2). In the embodiment, it is impossible to simply form the space 2c in the housing 2 and then place the flange 3 without performing a further process. Therefore, as described later, the housing 2 is produced by being split it into two portions, and the portions are press-fitted together. Alternatively, the housing 2 is produced with being split into two housing portions as shown by the phantom lines in FIG. 1, and the two housing portions are coupled with each other by welding to form the space 2c.

Thrust-dynamic pressure generating grooves 6 and 7 are formed in the upper and lower faces of the flange 3 disposed on the shaft 1. Alternatively, the thrust dynamic pressure generating grooves 6 and 7 may be formed in the upper and lower faces in the space 2c of the housing 2. Radial dynamic pressure generating grooves 4 and 5 which are formed in faces of the housing 2 opposed to the surface of the shaft 1 are disposed in positions respectively, adjacent to the end openings 2a and 2b of the housing 2. In this case, the radial dynamic pressure generating grooves 4 and 5 are formed vertically symmetrically with respect to the thrust dynamic pressure generating grooves 6 and 7 formed on both the faces of the flange 3. In other words, the radial dynamic pressure bearings are formed vertically symmetrically with respect to the thrust dynamic pressure bearings.

Figure 2:
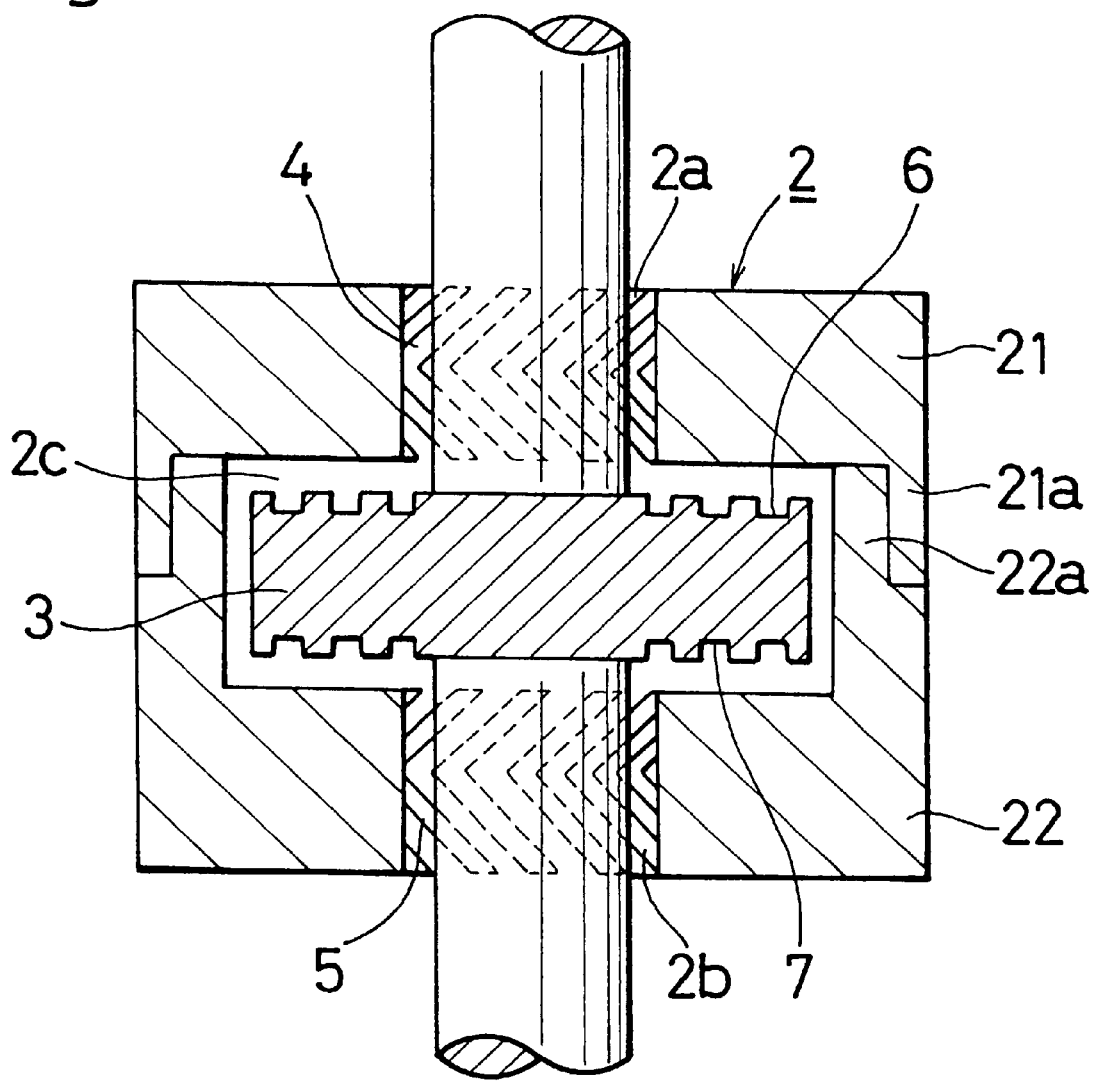
FIG. 2 is a view showing an embodiment of the dynamic pressure bearing device of the invention in which a housing is split and then assembled.

FIG. 2 is a view showing an embodiment of the dynamic pressure bearing device of the invention in which the housing 2 is split and then assembled. As described above, it is impossible to simply form the space 2c in the housing 2 and then place the flange 3 without performing a further process. Therefore, the housing 2 is produced by being split it into an upper housing portion 21 and a lower housing portion 22. A cylindrical portion 21a is formed in the upper housing portion 21, and a cylindrical portion 22a is formed in the lower-housing portion 22. An inner peripheral face of the cylindrical portion 21a of the upper housing portion is press-fitted onto the outer peripheral face of the cylindrical portion 22a of the lower housing portion. In this case, the radial dynamic pressure generating grooves 4 and 5 (radial dynamic pressure bearings) are separately configured so as to symmetrically sandwich the thrust dynamic pressure bearing portions in which the thrust dynamic pressure generating grooves 6 and 7 are formed.

Figure 3:
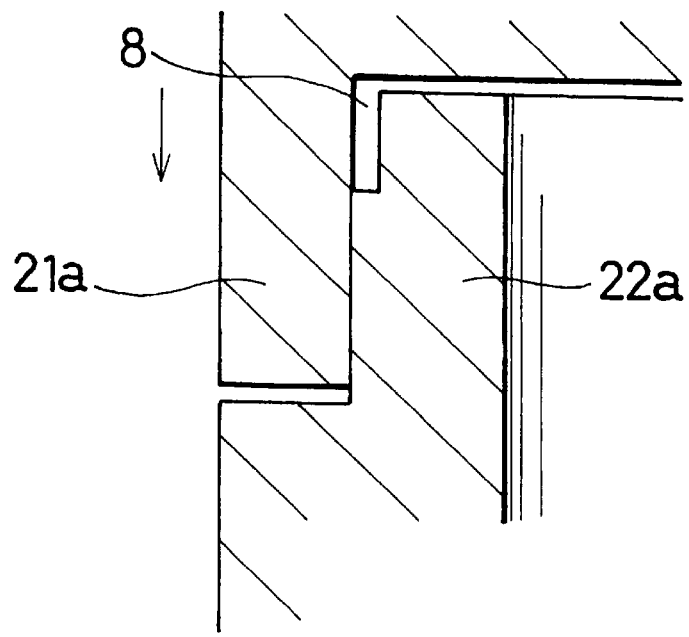
FIG. 3 is a view showing a specific method in which, in an embodiment of the dynamic pressure bearing device of the invention, upper and lower housing portions are press fitted to each other.
Figure 4:
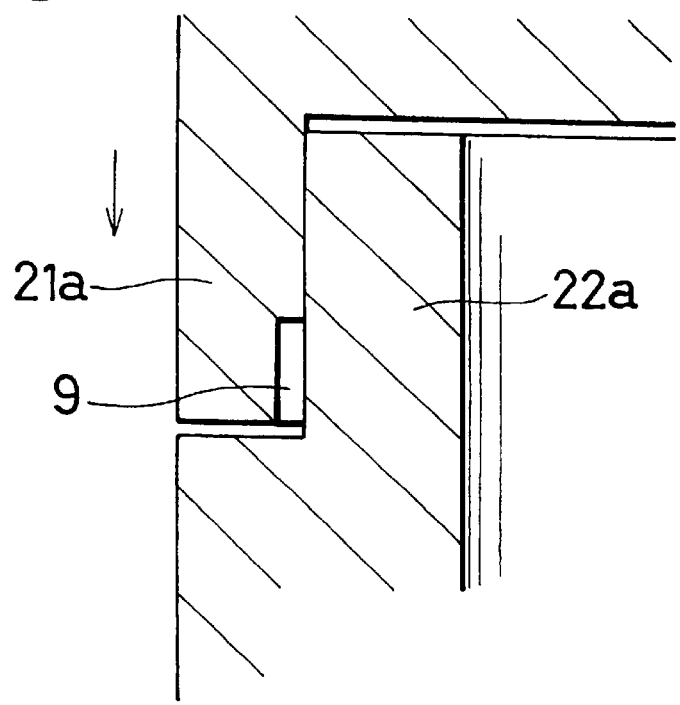
FIG. 4 is a view showing a specific method in which,in an embodiment of the dynamic pressure bearing device of the invention, upper and lower housing portions are press fitted to each other.
Figure 5:
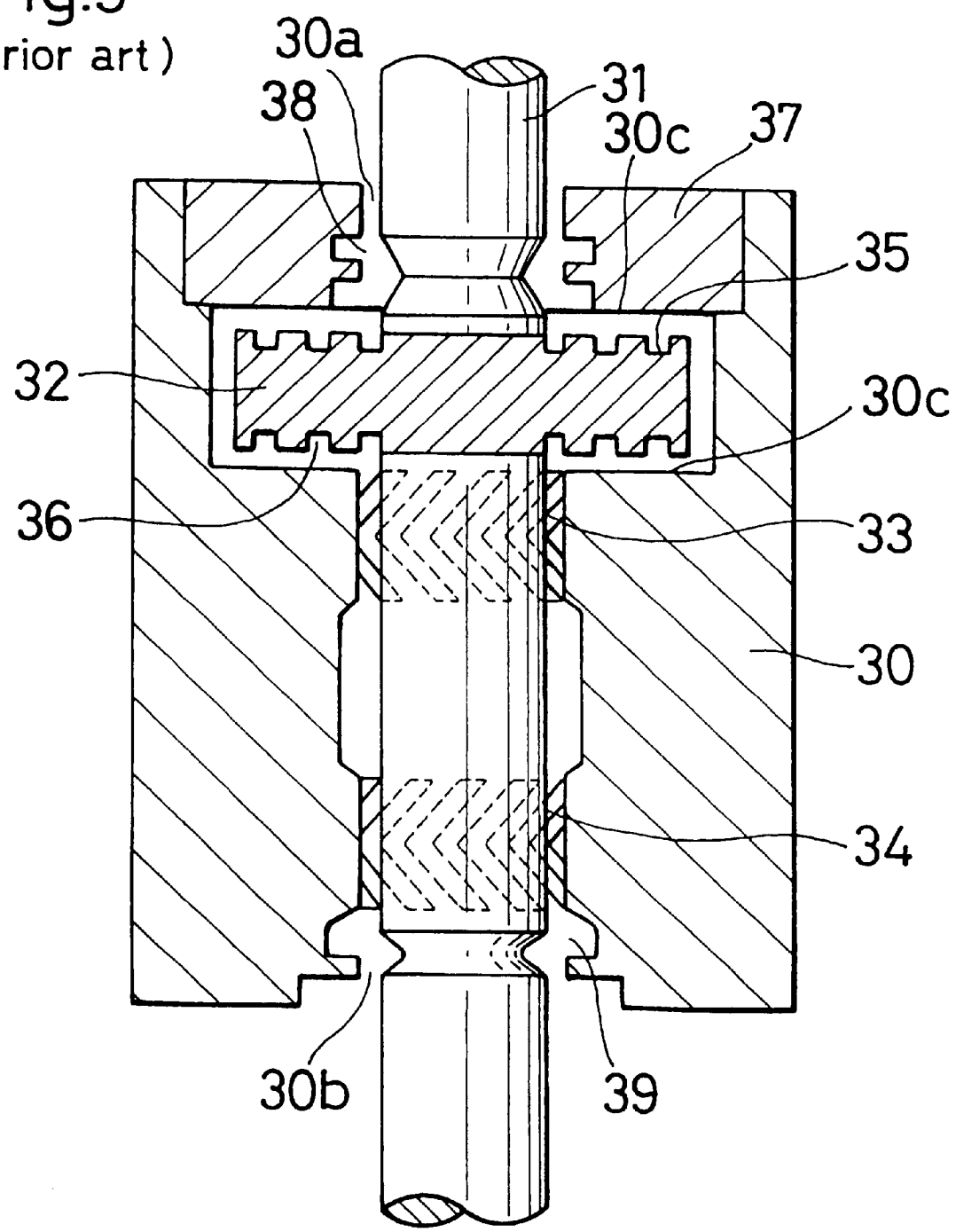
FIG. 5 is a section view of a dynamic pressure bearing device in which openings are formed in both end portions of a housing, and which has conventional radial and thrust dynamic pressure bearings.
Figure 6:
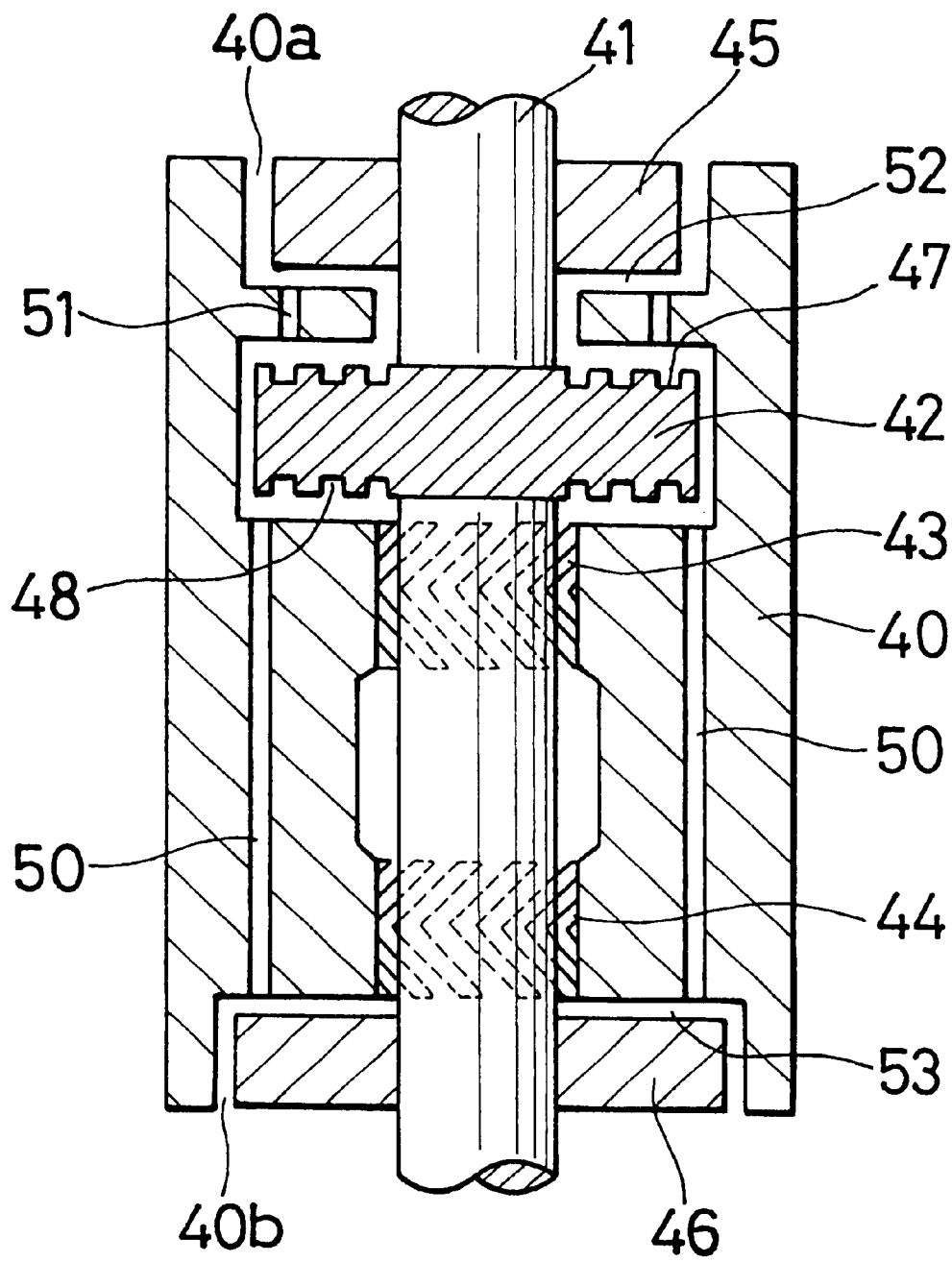
FIG. 6 is a section view of a dynamic pressure bearing device in which openings are formed in both end portions of a housing, and which has conventional radial and thrust dynamic pressure bearings.

FIGS. 3 and 4 are views respectively showing specific methods in the case where the upper and lower housing portions 21 and 22 are press-fitted to each other. As described above, the housing 2 is produced by being split it into the upper housing portion 21 and the lower housing portion 22, and the inner peripheral face of the cylindrical portion 21a of the upper housing portion is press-fitted onto the outer peripheral face of the cylindrical portion 22a of the lower housing portion. In this case, when an edge of one of the cylindrical portions abuts against the other cylindrical portion, a burr or a bent edge is formed, so that the fitting may not be satisfactorily performed. To comply with this, as shown in FIG. 3, a part of the outer peripheral face of the cylindrical portion 22a of the lower housing portion 22 is cutaway to form a fitting guiding portion 8, and the press-fitting is conducted after "loose fitting" is performed, or, as shown in FIG. 4, a part of the inner peripheral face of the cylindrical portion 21a of the upper housing portion 21 is cutaway to form a fitting guiding portion 9, and the press fitting is conducted after "loose fitting" is performed.

In the embodiment shown in FIG. 2, the housing 2 is produced by being split it into two portions and the portions are welded together after the flange 3 is placed. Alternatively, the housing 2 is split into the upper housing portion 21 and the lower housing portion 22 and the housing portions are press-fitted. The radial dynamic pressure generating grooves (radial dynamic pressure bearing portions) 4 and 5 are formed in positions adjacent to the end openings 2a and 2b. The flange 3 is placed between the radial dynamic pressure bearings. The thrust dynamic pressure generating grooves (thrust dynamic pressure bearing portions) 6 and 7 for supporting in both the directions are formed. In this case, precision threaded portions may be formed on the inner peripheral face of the cylindrical portion 21a of the upper housing portion 21, and the outer peripheral face of the cylindrical portion 22a of the lower housing portion 22, respectively, and the threaded portions may be then screwed together. This configuration where the upper housing portion 21 and the lower housing portion 22 are screwed to each other is convenient for use because the gaps of the thrust dynamic pressure bearings in the space 2c can be adequately adjusted.

As described above in detail, according to the dynamic pressure bearing device of the invention, the radial dynamic pressure bearings are adjacent to the end openings of the housing, and hence forces during rotation can be easily balanced with each other, with the result that it is possible to easily perform a control so as not to cause the lubricant (working fluid) from leaking. Furthermore, the resistance to variation of the moment load is improved. Because the radial dynamic pressure bearing portions which sandwich the thrust dynamic pressure bearing portions, and which are disposed in vicinities of the end openings are symmetrically formed, particularly, a flow of the lubricant (working fluid) hardly occurs. Therefore, the device exhibits further improved resistance to leakage. Since the housing is split into housing portions which are then press-fitted to each other, the structure is not complicated and is advantageous also from the viewpoint of cost.

What is claimed is:

1. A dynamic pressure bearing device comprising:

a housing having an opening in each of both end portions, and an internal space;

a shaft passing through said openings; and a flange disposed on said shaft, and radial dynamic pressure generating grooves and thrust dynamic pressure generating grooves are formed between said housing and said shaft, and between said internal space of said housing and said flange to form a radial dynamic pressure bearing portion and a thrust dynamic pressure bearing portion, respectively, wherein radial dynamic pressure bearings are respectively formed in vicinities of said end openings of said housing, and thrust dynamic pressure bearings for supporting upper and lower faces of said flange are formed between said radial dynamic pressure bearings.

2. A dynamic pressure bearing device according to claim 1, wherein said radial dynamic pressure bearings between which said thrust dynamic pressure bearings formed between said upper and lower faces of said flange and said internal space of said housing are interposed are formed symmetrically with respect to the thrust dynamic pressure bearings.

3. A dynamic pressure bearing device according to claim 1 or 2, wherein said housing for forming said radial dynamic pressure bearings with interposing said thrust dynamic pressure bearings is split into housing portions, a fitting guiding portion is disposed in a vicinity of said thrust dynamic pressure bearings, and said housing portions are fitted to each other.

4. A dynamic pressure bearing device comprising:

a flange disposed on a shaft defining an upper shaft portion above said flange and a lower shaft portion below said flange, said flange having an upper flange surface and a lower flange surface;

a housing defining an internal flange cavity in which said flange is disposed, said internal flange cavity having an upper internal surface and an opposing lower internal surface, said housing defining an upper shaft bore hole in said upper internal surface in which said upper shaft portion is disposed, and said housing defining a lower shaft bore hole in said lower internal surface in which said lower shaft portion is disposed;

said upper flange surface and said upper internal surface forming an upper thrust dynamic pressure bearing, and said lower flange surface and said lower internal surface forming a lower thrust dynamic pressure bearing;

said upper shaft bore hole and said upper shaft portion forming an upper radial dynamic pressure bearing above said upper thrust dynamic pressure bearing; and said lower shaft bore hole and said lower shaft portion forming a lower radial dynamic pressure bearing below said lower thrust dynamic pressure bearing.

5. The dynamic pressure bearing device according to claim 4, wherein said upper and said lower radial dynamic pressure bearings are symmetrically disposed about said upper and lower thrust dynamic pressure bearings of said flange.

6. The dynamic pressure bearing device according to claim 4 or 5, wherein:

said housing includes first and second housing portions which together define said flange cavity; and said first and second housing portions respectively have first and second engagement configurations press fit together.

* * * * *